United States Patent [19]
Fukushima et al.

[11] Patent Number: 5,299,988
[45] Date of Patent: Apr. 5, 1994

[54] CONTINUOUSLY VARIABLE TRACTION ROLLER TRANSMISSION

[75] Inventors: Hiroshi Fukushima, Yokohama; Masaki Nakano, Kawasaki, both of Japan

[73] Assignees: NSK Ltd, Tokyo; Nissan Motor Co., Ltd, Kanagawa, both of Japan

[21] Appl. No.: 871,793

[22] Filed: Apr. 21, 1992

[30] Foreign Application Priority Data

Apr. 23, 1991 [JP] Japan ............................ 3-036504[U]

[51] Int. Cl.⁵ ........................................... F16H 15/38
[52] U.S. Cl. ..................................... 476/42; 384/608
[58] Field of Search ................ 474/185, 186; 476/40, 476/42; 384/608; 74/866, 867

[56] References Cited

U.S. PATENT DOCUMENTS

| 2,123,007 | 7/1938 | Hayes | 476/42 X |
| 4,928,542 | 5/1990 | Nakano | 476/10 |
| 4,968,289 | 11/1990 | Nakano | 475/185 |
| 5,033,322 | 7/1991 | Nakano | 476/10 X |
| 5,067,360 | 11/1991 | Nakano | 476/10 |
| 5,144,850 | 9/1992 | Hibi | 476/42 X |
| 5,187,995 | 2/1993 | Nakano | 476/10 |

FOREIGN PATENT DOCUMENTS

| 62-71465 | 5/1987 | Japan . |
| 62-258255 | 11/1987 | Japan . |
| 2-163549 | 6/1990 | Japan . |
| 443472 | 2/1936 | United Kingdom . |
| 931078 | 7/1963 | United Kingdom . |
| 1469776 | 4/1977 | United Kingdom . |

*Primary Examiner*—Ramon S. Britts
*Assistant Examiner*—Roger J. Schoeppel
*Attorney, Agent, or Firm*—Wegner, Cantor, Mueller & Player

[57] ABSTRACT

A continuously variable traction roller transmission is disclosed. A torque transmission shaft is provided at one end thereof with a flange portion. A raceway track is formed on a connecting part between an inner side wall of the flange portion and an outer peripheral wall of the torque transmission shaft. Another raceway track is formed on an inner peripheral edge portion of an outer wall of a cam plate which constitutes a pressure mechanism. A plurality of balls are arranged between both of the raceway tracks, whereby a thrust ball bearing is constructed. Thrust load exerted on the cam plate is borne by the thrust ball bearing.

1 Claim, 4 Drawing Sheets

CONTINUOUSLY VARIABLE TRACTION ROLLER TRANSMISSION

BACKGROUND OF THE INVENTION a) Field of the Invention

This invention relates to a continuously variable traction roller transmission useful, for example, as a transmission for an automobile or a light vehicle such as a lawn tractor, snow thrower or fork-lift truck, or as a transmission for rotating an accessory for an automotive engine at a suitable number of revolutions irrespective of variations in the number of revolutions of the engine.

b) Description of the Related Art

Research has been made with a view toward using a continuously variable traction roller transmission, such as that illustrated schematically in FIGS. 4 and 5, as a transmission for an automotive vehicle having relatively small engine output (for example, of 100 hp or less), such as a motorcycle, or for a light vehicle which runs at low speed, such as a lawn tractor, snow thrower, electric car or fork-lift truck, or as a transmission for driving an accessory such as a compressor or generator at an optimal speed irrespective of variations in the number of revolutions of an engine.

As is disclosed, for example, in Japanese Utility Model Application Laid-Open (Kokai) No. SHO 62-71465 (laid-open date: May 7, 1987), the continuously variable traction roller transmission has an input disk 2 supported concentrically with an input shaft 1 and an output disk 4 fixed on an end portion of an output shaft 3. On an inner wall of an unillustrated casing with the continuously variable traction roller transmission accommodated therein or on a supporting bracket provided inside the casing, there are provided trunnions 5,5 which are rockable about their corresponding pivots 28,28 located at positions skewed relative to the input shaft 1 and the output shaft 3.

Both the trunnions 5,5 are made of a metallic material having sufficient stiffness and are provided on both outer end walls thereof with the pivots 28,28, respectively. Further, power rollers 7,7 are rotatably supported about their corresponding displaceable pins 6,6 which are secured centrally on the respective trunnions 5,5. The power rollers 7,7 are held between the input disk 2 and the output disk 4.

Mutually opposing inner walls 2a,4a of the input and output disks 2,4 are in the form of concave walls of a circular arc shape in cross-section, which concave walls extend about the pivots 28,28, respectively. Peripheral walls 7a,7a of the respective power rollers 7,7, said peripheral walls 7a,7a being formed in the spherical convex walls, are maintained in contact with the inner walls 2a,4a.

Arranged between the input shaft 1 and the input disk 2 is a pressure mechanism 8 of the loading cam type. By this pressure mechanism 8, the input disk 2 is resiliently pressed toward the output disk 4. The pressure mechanism 8 is constructed of a cam plate 9 rotatable together with the input shaft 1 and plural (for example, four) rollers 11,11 held by a retainer 10. On one side (the right-hand side as viewed in FIGS. 4-5) of the cam plate 9, a cam surface 12 is formed as an alternate concave and convex surface extending in an angular direction. A similar cam surface 13 is also formed on an outer side (i.e., the left-hand side as viewed in FIGS. 4-5) of the input disk 2. The plural rollers 11,11 are rotatable about axes which extend radially relative to the central axis of the input shaft 1.

The continuously variable traction roller transmission of the construction as described above operates in the following manner.

As the cam plate 9 rotates pursuant to rotation of the input shaft 1, the plural rollers 11,11 are pressed by the cam surface 12 against the cam surface 13 on the outer side of the input disk 2. As a result, the input disk 2 is pressed against the plural power rollers 7,7 and, at the same time, the input disk 2 rotates based on meshing engagement between the paired cam surfaces 12,13 and the plural rollers 11,11. The rotation of the input disk 2 is transmitted to the output disk 4 by way of the plural power rollers 7,7, whereby the output shaft 3 fixed with the output disk 4 rotates.

To change the revolution speed between the input shaft 1 and the output shaft 3, say, first to achieve a reduction in speed between the input shaft 1 and the output shaft 3, both the trunnions 5,5 are rocked about the pivots 28,28 to tilt the displaceable pins 6,6 so that, as shown in FIG. 4, the peripheral walls 7a,7a of the individual power rollers 7,7 are brought into contact with a center-side part of the inner wall 2a of the input disk 2 and also with an outer-periphery-side part of the inner wall 4a of the output disk 4.

To achieve an increase in speed, conversely, the trunnions 5,5 are rocked to tilt the displaceable pins 6,6 so that, as illustrated in FIG. 5, the peripheral walls 7a,7a of the individual power rollers 7,7 are brought into contact with an outer-periphery-side part of the inner wall 2a of the input disk 2 and also with a center-side part of the inner wall 4a of the output disk 4.

If the angle of tilt of the respective displaceable pins 6,6 is set at values between FIG. 4 and FIG. 5, intermediary speed change ratios can be obtained between the input shaft 1 and the output shaft 3.

To increase the power transmittable by a continuously variable traction roller transmission constructed and operating as described above, it has already been proposed to arrange two continuously variable traction roller transmissions, which are similar to the one shown in FIGS. 4-5, in a pair and in parallel in the power-transmitting direction (i.e., in tandem) as is disclosed in Japanese Patent Application Laid-Open No. HEI 2-163549 (laid-open date: Jun. 22, 1990), etc.

FIG. 6 illustrates the construction of the power transmission disclosed in the above patent publication, in which the continuously variable traction roller transmissions are arranged in tandem.

Designated at numeral 14 is a tubular torque transmission shaft. A needle bearing 27 is disposed between an inner peripheral wall of one end portion (the left-hand end portion as viewed in FIG. 6) of the torque transmission shaft 14 and an outer peripheral wall of a proximal end portion of an input shaft 1, so that the torque transmission shaft 14 is arranged concentrically with the input shaft 1, and the input shaft 1 and the torque transmission shaft 14 are rotatable independently of each other.

Along the torque transmission shaft 14, a pair of input disks 2,2' are provided with an interval therebetween. Ball splines 15,15' are disposed between inner peripheral edges of the individual input disks 2,2' and an outer peripheral wall 14a of the torque transmission shaft 14, respectively, whereby the input disks 2,2' are supported unrotatably relative to the torque transmission shaft 14 but displaceably along the axis of the torque transmission shaft 14. Inner walls 2a,2a' of the input disks 2,2' are in the form of concave walls of a circular arc shape in cross-section.

Between the paired input disks 2,2', a pair of output disks 4,4' are arranged rotatably relative to the torque transmission shaft 14 and displaceably along the axis of the torque transmission shaft 14. Inner walls 4a',4a' of the respective output disks 4,4' are in the form of concave walls of a circular arc shape in cross-section. It is to be noted that the term "inner walls" of the individual disks 2,2',4,4' means the mutually opposing sides of the individual disks 2,2',4,4' throughout the specification.

A ring-shaped output gear 18 is provided between the output disks 4,4'. This output gear 18 is fixedly secured on an outer peripheral wall of an intermediate portion of a cylindrical sleeve 19. The sleeve 19 is in turn supported on an outer peripheral wall of an intermediate portion of the torque transmission shaft 14 in such a way that the sleeve 19 is allowed to rotate relative to the torque transmission shaft 14 and is somewhat displaceable along the axis of the torque transmission shaft 14. The paired output disks 4,4' are connected through splines to outer peripheral walls of opposite end portions of the sleeve 19, respectively.

A cam plate 9 is rotatably supported via a thrust ball bearing 16 on one end of the torque transmission shaft 14. The cam plate 9 and the input shaft 1 are connected by a flange 17 so that the cam plate 9 can rotate together with the input shaft 1. Between a cam surface 12 formed on the inner wall of the cam plate 9 and a cam surface 13 formed on the outer wall of the input disk 2 which is positioned on the left-hand side as viewed in FIG. 6, there are provided plural rollers 11 which are held rotatably by a retainer 10, thereby constructing a pressure mechanism which serves to urge the input disk 2 along the torque transmission shaft in a direction away from the cam plate 9.

A stopper 20 and disk springs 21 are arranged between the other input disk 2', which is not opposing the pressure mechanism 8 and is positioned on the right-hand side as viewed in FIG. 6, and the torque transmission shaft 14, so that the stopper 20 and disk springs 21 constitute a stopper means for preventing the input disk 2' from moving in a direction away from the pressure mechanism 8.

Arranged between the inner walls 2a,2a' of the paired input disks 2,2' and the inner walls 4a,4a' of the paired output disks 4,4', respectively, are plural trunnions 5,5' rockable about pivots located at positions skewed relative to the torque transmission shaft 14 and power rollers 7 having peripheral walls 7a in the form of spherical convex walls and supported rotatably about displaceable pins 6 supported on the trunnions 5,5'. Based on pressing force from the pressure mechanism 8, the peripheral walls 7a of the respective power rollers 7 are brought into contact with the inner walls 2a,2a',4a,4a' of the input and output disks 2,2',4,4'.

In the structure constructed as described above and having the paired continuously variable traction roller transmissions arranged in tandem, rotary torque inputted from the single input shaft 1 is transmitted to the input disk 2 via the flange 17, cam plate 9 and pressure mechanism 8 so that the input disk 2 rotates together with the torque transmission shaft 14. Concurrently with the rotation of the torque transmission shaft 14, the other input disk 2' also rotates in synchronization with the one input disk 2.

Rotations of the paired input disks 2,2', which rotate in synchronization with each other via the torque transmission shaft 14, are transmitted to the paired output disks 4,4' by way of the plural power rollers 7, thereby rotating the sleeve 19 on which both of the output disks 4,4 are connected through splines. The rotation of the sleeve 19 is then taken out by way of the output gear 18.

The structure constructed and operating as described above, in which the continuously variable traction roller transmissions are arranged in pair and in tandem, however still involves problems to be solved, as will be described below.

The portion where the cam plate 9 is rotatably supported on the end portion of the torque transmission shaft 14 is constructed, as is shown in FIGS. 6 and 3, by providing the thrust ball bearing 16 between a flange portion 22 formed on the outer peripheral wall of the end portion of the torque transmission shaft 14 and an inner peripheral edge portion of an outer wall of the cam plate 9. The thrust ball bearing 16 is composed of a pair of races 23,23 and a plurality of balls 24,24. One of the races 23,23 is provided in contact with the inner wall of the flange portion 22, while the other race 23 is disposed in contact with the inner peripheral edge portion of the outer wall of the cam plate 9.

Upon operation of the continuously variable traction roller transmission, thrust load is applied to the thrust ball bearing 16 in response to actuation of the pressure mechanism 8. The point of action of the thrust load is still outside the outer peripheral edge of the flange portion 22.

The flange portion 22 is therefore applied with force which presses the outer peripheral edge portion of the flange portion 22 in a direction away from the cam plate 9 (i.e., in the leftward direction as viewed in FIGS. 3 and 6). Unless some measure is taken, there is the potential danger that the flange portion 22 may be broken when unduly large force is applied by the pressure mechanism 8.

To avoid breakage of the flange portion 22 for such a cause as mentioned above, it is effective to form the connecting part between the outer peripheral wall 14a of the torque transmission shaft 14 and the inner side wall 22a of the flange portion 22 (i.e., the part indicated by A in FIG. 3) into a circular arc, concave wall having a large radius of curvature. It is, however, cumbersome to machine the connecting part into a circular arc, concave wall having a large radius of curvature and also the inner peripheral edge portion of the associated race 23 into such a circular arc, convex surface as not interfering with the circular arc, concave wall, thereby increasing the manufacturing cost of the continuously variable traction roller transmission. It is therefore not preferred to form the connecting part into such a circular arc, concave wall having a large radius of curvature.

SUMMARY OF THE INVENTION

A continuously variable traction roller transmission according to the present invention has been completed with the foregoing circumstances in view.

In one aspect of the present invention, there is thus provided a continuously variable traction roller transmission comprising an input shaft; a torque transmission shaft arranged concentrically with the input shaft and rotatable independently of the input shaft; first and second input disks disposed in a pair along the torque transmission shaft with an interval between the first and second input disks, each of said first and second input disks being incapable of rotation relative to the torque transmission shaft, at least one of said first and second input disks being rotatable relative to the torque transmission shaft and displaceable along an axis of the torque transmission shaft, and said first and second input disks having inner walls in the form of concave walls of a circular arc shape in cross-section; first and second output disks supported in a pair between both the first and second input disks rotatably relative to the torque transmission shaft and displaceably along the axis of the torque transmission shaft and having inner walls in the form of concave walls of a circular arc shape in cross-section; a cam plate rotatably supported on one end of the torque transmission shaft via a thrust ball bearing and rotatable together with the input shaft; a pressure mechanism disposed between the cam plate and one of the first and second input disks for urging said one input disk in a direction away from the cam plate along the axis of the torque transmission shaft; a stopper means for preventing the other input disk from moving in a direction away from the cam plate; trunnions rockable about their corresponding pivots located respectively at positions skewed relative to the torque transmission shaft; power rollers having peripheral walls in the form of spherical convex walls, supported rotatably on displaceable pins supported on the respective trunnions, and held between the input disks and the output disks associated therewith; and an output means for combining and outputting rotations of the paired output disks, characterized in that one of raceway tracks of the thrust ball bearing is formed directly on a connecting part between an inner wall of a flange portion formed at the one end of the torque transmission shaft and an outer peripheral wall of the torque transmission shaft, and the other raceway track of the thrust ball bearing is formed directly on an inner peripheral edge portion of an outer wall of the cam plate.

Operation for varying the speed change ratio between the input shaft and the output means as desired by the continuously variable traction roller transmission according to the present invention is by itself similar to the operation of the conventional continuously variable traction roller transmission described above.

Even when a large load is applied to the thrust ball bearing in response to actuation of the pressure mechanism in the continuously variable traction roller transmission according to the present invention, no unduly large stress occurs locally at the flange portion formed at the one end of the torque transmission shaft so that the flange portion can be protected from breakage. Moreover, the omission of races makes it possible to achieve a weight reduction. Owing to the construction described above, the continuously variable traction roller transmission according to the present invention can be provided at lower manufacturing cost with lighter weight and improved durability.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENT

Figure 1:
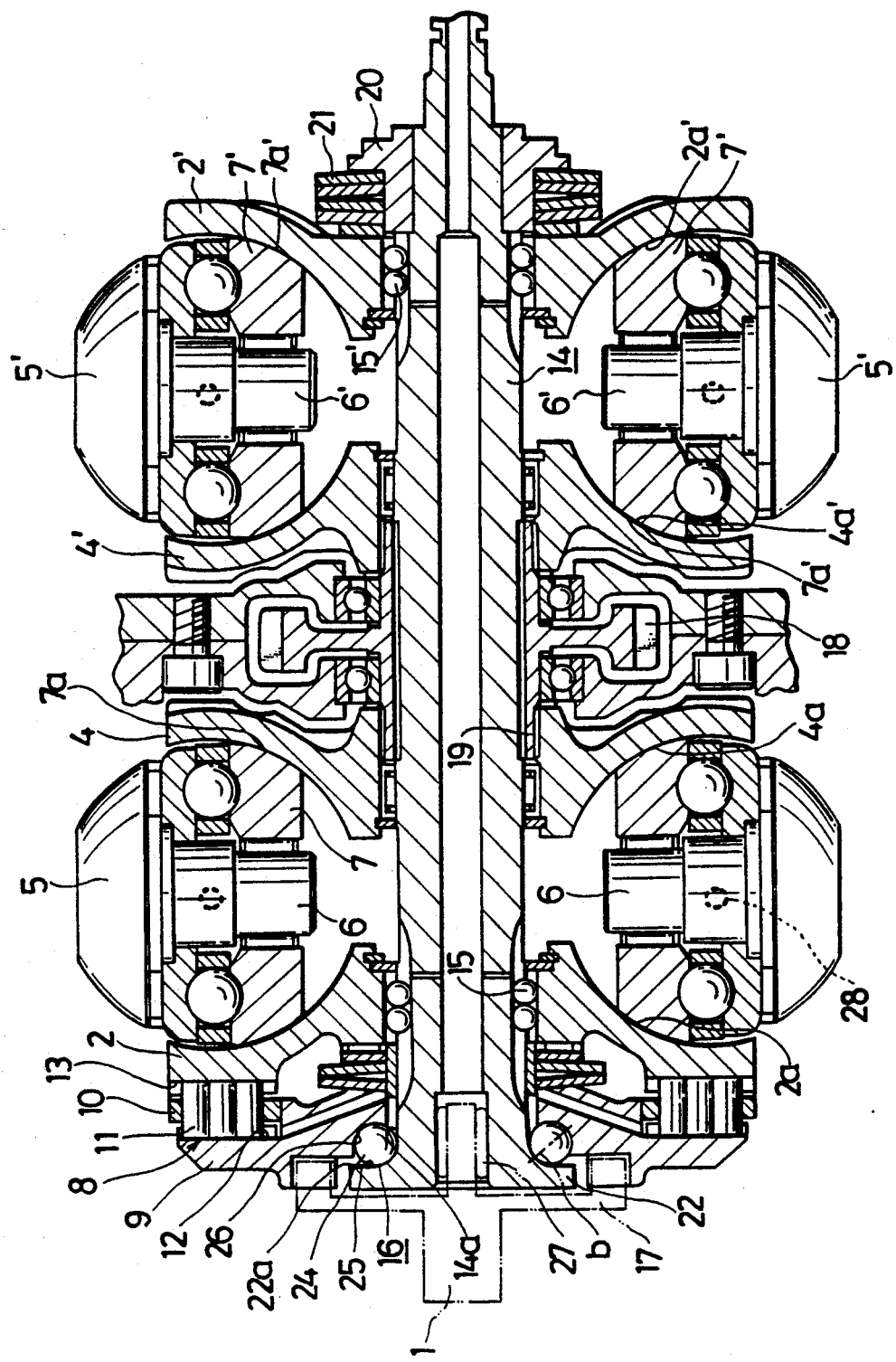
FIG. 1 is an axial cross-sectional view of a continuously variable traction roller transmission according to one embodiment of the present invention.

One embodiment of the present invention will hereinafter be described with reference to FIGS. 1 and 2. The continuously variable traction roller transmission according to the present invention features the construction of the thrust ball bearing and the other parts are similar to the corresponding parts in the conventional structure. Like elements are therefore identified by like reference numerals, and their description is omitted to avoid unnecessary reiteration. A description will hence be made, centering around the thrust ball bearing.

On the connecting part between the inner wall 22a of the flange portion 22 formed at the one end (i.e., the left-hand end as viewed in FIGS. 1-2) of the torque transmission shaft 14 and the outer peripheral surface 14a of the torque transmission shaft 14, one of raceway tracks of the thrust ball bearing 16, i.e., a raceway track 25 is formed directly so that the connecting part between the inner wall 22a and the outer peripheral wall 14a is formed into a circular arc, concave wall having a large radius of curvature. Further, the other raceway track 26 of the thrust ball bearing 16 is formed directly on the inner peripheral edge portion of the outer wall of the cam plate 9.

As a result, the thrust ball bearing 16 is constructed between the flange portion 22 and the cam plate 9. As in angular ball bearings, lines b connecting the points of contact of the balls 24,24 with the raceway track 25 to the points of contact of the same balls 24,24 with the raceway track 26 extend oblique. With respect to the points of contact of the balls 24,24 with the respective raceway tracks 25,26, the points of contact on the side of the flange portion 22 are located closer to the central axis of the torque transmission shaft 14 than the points of contact on the side of the cam plate 9.

Figure 2:
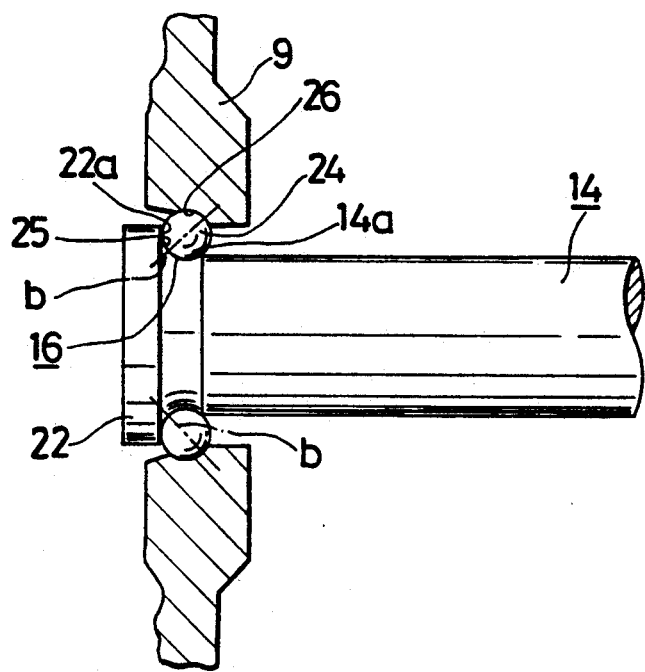
FIG. 2 is a fragmentary cross-sectional view of the continuously variable traction roller transmission.

When the cam plate 9 is urged leftwards as viewed in FIGS. 1 and 2 in response to actuation of the pressure mechanism 8, the flange portion 22 is pressed by the plural balls 24,24. Owing to the provision of the raceway track 25 having the relatively large radius of curvature on the connecting part between the inner wall 22a of the flange portion 22 and the outer peripheral wall 14a of the torque transmission shaft 14, no localized large stress however occurs at the connecting part.

Moreover, lines of action of the load, said lines conforming with the lines b connecting the points of contact of the respective balls 24,24 with the raceway track 25 to those of the balls 24,24 with the raceway track 26, are aslant such that they become closer to the central axis of the torque transmission shaft 14 as they approach toward the flange portion 22. Moment which is applied to the flange portion 22 in response to actuation of the pressure mechanism 8, therefore, becomes much smaller compared with the conventional structure. As a result, the flange portion 22 can be surely protected from breakage.

Figure 3:
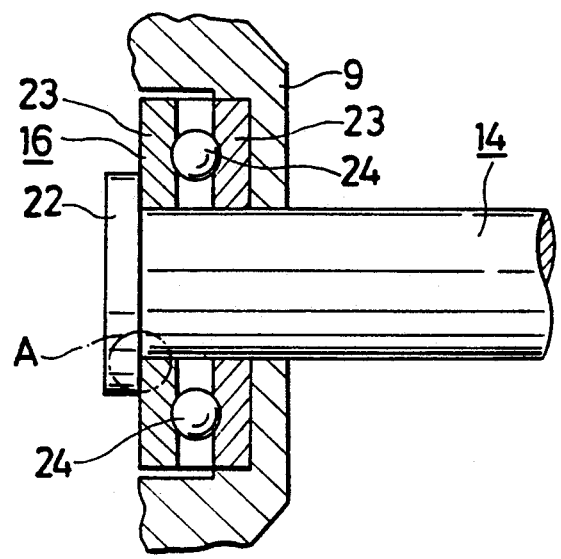
FIG. 3 is a similar fragmentary cross-sectional view to FIG. 2, showing a conventional structure.
Figure 4:
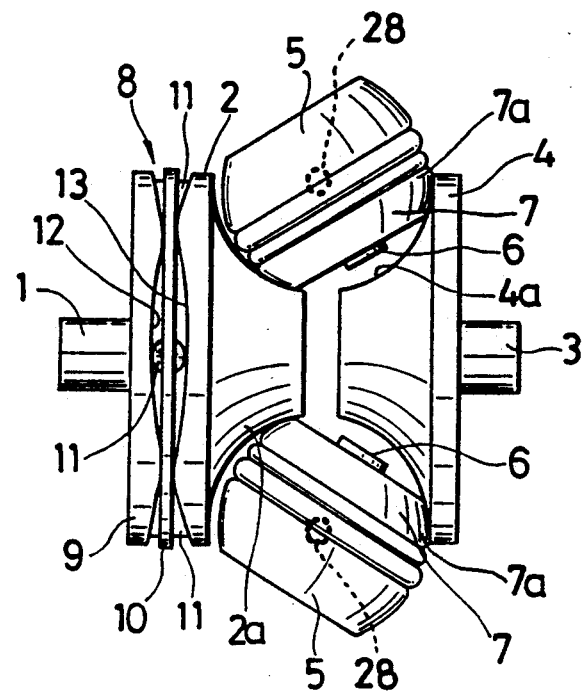
FIG. 4 is a side view of a basic structure of a continuously variable traction roller transmission, in which the transmission is a position to give a maximum speed reduction.
Figure 5:
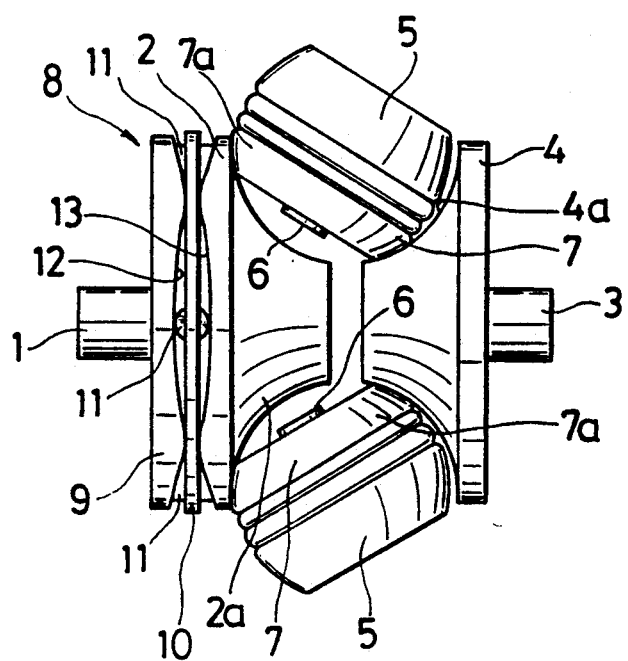
FIG. 5 is a similar side view to FIG. 4 except that the transmission is a position to give a maximum speed increase.
Figure 6:
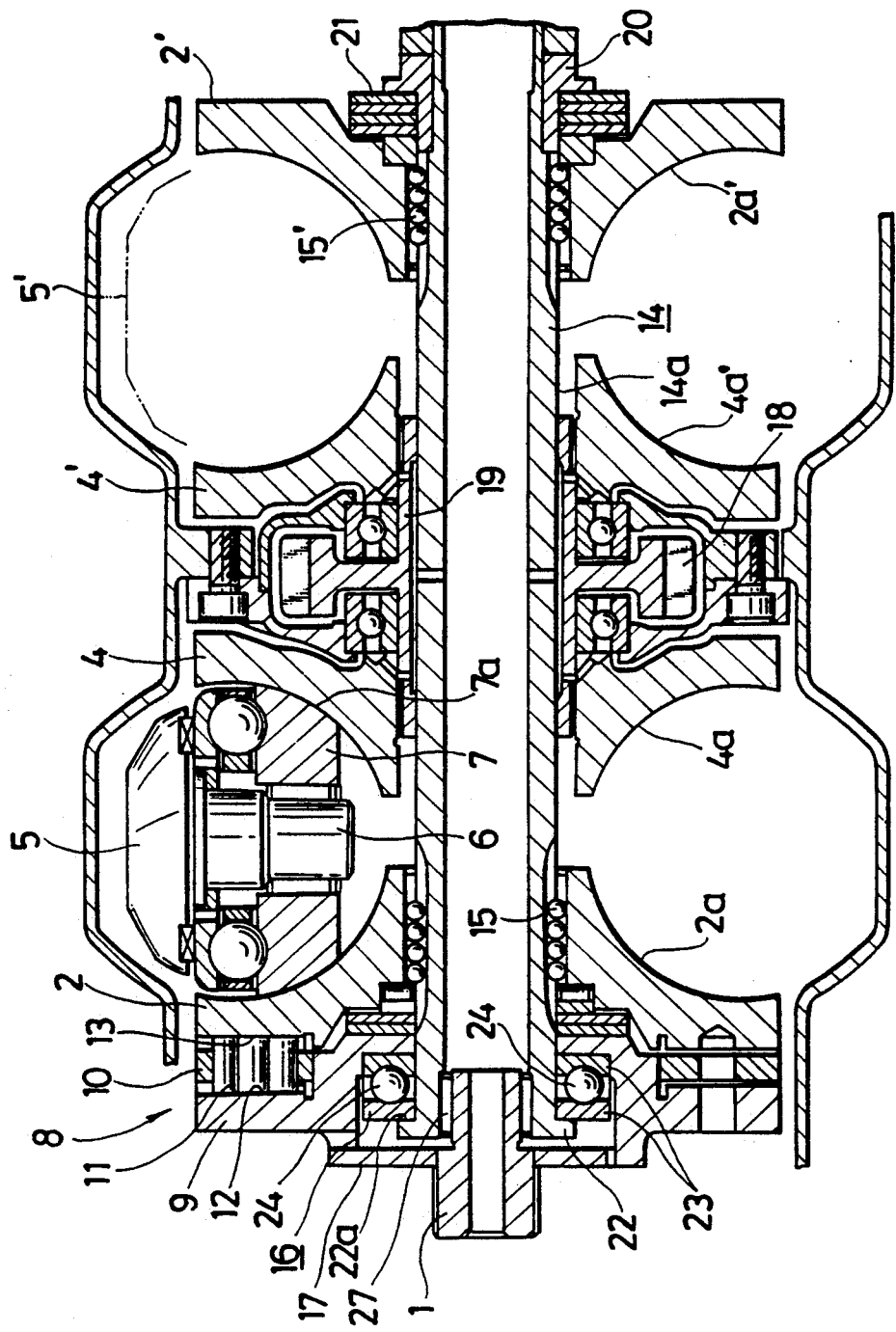
FIG. 6 is an axial cross-sectional view of a conventional continuously variable traction roller transmission.

The races 23,23 (see FIGS. 3 and 6) employed in the conventional structure are not longer required. Owing to the elimination of the weight of the races 23,23 and also shortening of the torque transmission shaft 14, a weight reduction is feasible.

What is claimed is:

1. In a continuously variable traction roller transmission comprising:

an input shaft;

a torque transmission shaft arranged concentrically with the input shaft and rotatable independently of the input shaft;

first and second input disks disposed in a pair along the torque transmission shaft with an interval between the first and second input disks, each of said first and second input disks being incapable of rotation relative to the torque transmission shaft, at least one of said first and second input disks being rotatable relative to the torque transmission shaft and displaceable along an axis of the torque transmission shaft, and said first and second input disks having inner walls in the form of concave walls of a circular arc shape in cross-section;

first and second output disks supported in a pair between both the first and second input disks rotatably relative to the torque transmission shaft and displaceably along the axis of the torque transmission shaft and having inner walls in the form of concave walls of a circular arc shape in cross-section;

a cam plate rotatably supported on one end of the torque transmission shaft via a thrust ball bearing and rotatable together with the input shaft;

a pressure mechanism disposed between the cam plate and one of the first and second input disks for urging said one input disk in a direction away from the cam plate along the axis of the torque transmission shaft;

a stopper means for preventing the other input disk from moving in a direction away from the cam plate;

trunnions rockable about their corresponding pivots located respectively at positions skewed relative to the torque transmission shaft;

power rollers having peripheral walls in the form of spherical convex walls, supported rotatably on displaceable pins supported on the respective trunnions, and held between the input disks and the output disks associated therewith;

an output means for combining and outputting rotations of the paired output disks;

the thrust ball bearing having a pair of raceway tracks, one of which is formed directly on a connecting part between an inner wall of a flange portion formed at the one end of the torque transmission shaft and an outer peripheral wall of the torque transmission shaft, and the other raceway track of the thrust ball bearing is formed directly on an inner peripheral edge portion of an outer wall of the cam plate; and wherein balls of the thrust ball bearing are disposed radially inside the pressure mechanism so that the balls and the pressure mechanism overlap at least partially in the direction of the axis of the torque transmission shaft.

* * * * *